US011402486B2

(12) United States Patent
Zhang et al.

(10) Patent No.: US 11,402,486 B2
(45) Date of Patent: Aug. 2, 2022

(54) METHOD FOR THE RECOGNITION OF OBJECTS

(71) Applicant: Aptiv Technologies Limited, St. Michael (BB)

(72) Inventors: Tao Zhang, Dusseldorf (DE); Honghui Yan, Wuppertal (DE); Wolfgang Doerr, Wiehl (DE); Alexander Ioffe, Bonn (DE)

(73) Assignee: Aptiv Technologies Limited, St. Michael (BB)

( * ) Notice: Subject to any disclaimer, the term of this patent is extended or adjusted under 35 U.S.C. 154(b) by 798 days.

(21) Appl. No.: 16/366,005

(22) Filed: Mar. 27, 2019

(65) Prior Publication Data

US 2019/0317204 A1 Oct. 17, 2019

(30) Foreign Application Priority Data

Apr. 11, 2018 (EP) .................................... 18166848

(51) Int. Cl.
*G01S 13/58* (2006.01)
*G01S 13/50* (2006.01)
(Continued)

(52) U.S. Cl.
CPC .......... *G01S 13/584* (2013.01); *G01S 13/505* (2013.01); *G01S 13/89* (2013.01); *G01S 13/931* (2013.01)

(58) Field of Classification Search
CPC ...... G01S 13/584; G01S 13/505; G01S 13/89; G01S 13/931; G01S 13/726; G01S 13/74;
(Continued)

(56) References Cited

U.S. PATENT DOCUMENTS 4,958,638 A 9/1990 Sharpe et al.
5,689,268 A 11/1997 Shi
(Continued)

FOREIGN PATENT DOCUMENTS

CN 104360336 2/2015
DE 10 2014 218092 A1 3/2016
(Continued)

OTHER PUBLICATIONS

O. Bialer and S. Kolpinizki, "Multi-Doppler resolution automotive radar," 2017 25th European Signal Processing Conference ( EUSIPCO), 2017, pp. 1937-1941, doi: 10.23919/EUSIPCO.2017.8081547. (Year: 2017).*
(Continued)

*Primary Examiner* — Bernarr E Gregory
*Assistant Examiner* — Yonghong Li
(74) *Attorney, Agent, or Firm* — Sawtooth Patent Group PLLC

(57) ABSTRACT

A method includes identifying, from a reflected radar signal, a plurality of single detections corresponding to object surface spots detected by the radar sensor system, wherein the positions of the single detections in a Range-Doppler-map are deter-mined, wherein at least a region of the Range-Doppler map is divided into a plurality of adjacent evaluation regions separated by separation lines, wherein the separation lines extend parallel to one of the range axis and the Doppler axis. For each evaluation region, at least one selected detection is determined which has, among the detections present in the respective evaluation region, an extremal value with respect to the other axis of the range axis and the Doppler axis, and a boundary of the at least one object is determined based on the selected detections.

20 Claims, 7 Drawing Sheets

(51) Int. Cl.
*G01S 13/89* (2006.01)
*G01S 13/93* (2020.01)
*G01S 13/931* (2020.01)

(58) Field of Classification Search
CPC ......... G01S 13/872; G01S 2013/93271; G01S 2013/93274; G01S 2013/9375
See application file for complete search history.

(56) References Cited

U.S. PATENT DOCUMENTS

| | | | | |
|---|---|---|---|---|
| 6,121,916 | A | 9/2000 | Mcdade | |
| 6,653,971 | B1 | 11/2003 | Guice et al. | |
| 6,674,394 | B1 | 1/2004 | Zorati | |
| 8,068,134 | B2 * | 11/2011 | Yoshizawa | G06V 20/58 348/148 |
| 8,854,251 | B2 | 10/2014 | Tokoro | |
| 9,746,549 | B1 * | 8/2017 | Parker | G01S 7/292 |
| 10,502,826 | B2 * | 12/2019 | Tasovac | G01S 13/878 |
| 10,929,653 | B2 | 2/2021 | Yan et al. | |
| 11,131,766 | B2 | 9/2021 | Yan et al. | |
| 2002/0028003 | A1 | 3/2002 | Krebs et al. | |
| 2003/0225517 | A1 | 12/2003 | Schiffmann | |
| 2010/0074379 | A1 | 3/2010 | Li | |
| 2010/0286543 | A1 | 11/2010 | Balasaheb Patil et al. | |
| 2011/0077532 | A1 | 3/2011 | Kim et al. | |
| 2011/0102234 | A1 | 5/2011 | Adams et al. | |
| 2013/0329523 | A1 | 12/2013 | Karl | |
| 2014/0261887 | A1 | 9/2014 | Groot et al. | |
| 2016/0054438 | A1 | 2/2016 | Patole et al. | |
| 2016/0124087 | A1 | 5/2016 | Stainvas et al. | |
| 2016/0259037 | A1 | 9/2016 | Molchanov et al. | |
| 2016/0284213 | A1 * | 9/2016 | Cao | G01S 13/584 |
| 2016/0320853 | A1 | 11/2016 | Lien et al. | |
| 2017/0057497 | A1 | 3/2017 | Laur et al. | |
| 2017/0059695 | A1 * | 3/2017 | Fetterman | G01S 13/726 |
| 2017/0085771 | A1 | 3/2017 | Schwager et al. | |
| 2017/0097413 | A1 | 4/2017 | Gillian et al. | |
| 2017/0276788 | A1 | 9/2017 | Wodrich | |
| 2017/0356991 | A1 * | 12/2017 | Yosoku | G01S 13/60 |
| 2019/0137606 | A1 | 5/2019 | Buddendick et al. | |
| 2019/0206070 | A1 | 7/2019 | Nash et al. | |
| 2019/0318162 | A1 | 10/2019 | Yan et al. | |
| 2020/0064444 | A1 | 2/2020 | Regani et al. | |
| 2020/0124706 | A1 | 4/2020 | Buddendick et al. | |
| 2020/0142029 | A1 | 5/2020 | Brooker et al. | |
| 2020/0160046 | A1 | 5/2020 | Andreou et al. | |

FOREIGN PATENT DOCUMENTS

| | | |
|---|---|---|
| DE | 102015007040 | 12/2016 |
| DE | 102016213254 | 7/2017 |
| DE | 102016215102 | 12/2017 |
| DE | 102016213007 | 1/2018 |
| WO | 2017/039862 A1 | 3/2017 |

OTHER PUBLICATIONS

"Extended European Search Report", EP Application No. 18166844.3, dated Oct. 9, 2018, 7 pages.
"Notice of Allowance", U.S. Appl. No. 16/361,897, dated Sep. 17, 2020, 8 Pages.
Caspar, "Performance Comparison Between a Camera Only AEB-FCW and a Camera-Radar Fusion Aeb-FCW", Mar. 2017, 8 pages.
Fei, et al., "Human Gait Recognition Using Micro-Doppler Features", May 2012, pp. 331-335.
Ghaleb, et al., "A refine Micro-Doppler Analysis of Pedestrians in ISAR Imaging", Jun. 2008, 4 pages.
Gurbuz, et al., "Operational Assessment and Adaptive Selection of Micro-Doppler Features", Dec. 2015, pp. 1196-1204.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
Kim, et al., "Human Detection Using Doppler Radar Based on Physical Characteristics of Targets", Feb. 2015, pp. 289-293.
Lupfer, et al., "Increasing FastSLAM Accuracy for Radar Data by Integrating the Doppler Information", Mar. 4, 2017, 4 pages.
Schafer, "What is a Savitzky-Golay Filter", Jul. 2011, 7 pages.
Van Dorp, et al., "Feature-based Human Motion Parameter Estimation with Radar", May 2008, pp. 135-145.
Yan, et al., "Micro-Doppler Based Classifying Features for Automotive Radar VRU Target Classification", Jun. 5, 2017, 8 pages.
"Non-Final Office Action", U.S. Appl. No. 16/359,301, dated Dec. 7, 2020, 7 pages.
"Notice of Allowance", U.S. Appl. No. 16/361,897, dated Dec. 2, 2020, 8 pages.
"Supplemental Notice of Allowance", U.S. Appl. No. 16/361,897, dated Jan. 25, 2021, 2 pages.
"Notice of Allowance", U.S. Appl. No. 16/359,301, dated Jul. 7, 2021, 7 pages.
"Final Office Action", U.S. Appl. No. 16/359,301, dated Apr. 5, 2021, 11 pages.

* cited by examiner

METHOD FOR THE RECOGNITION OF OBJECTS

TECHNICAL FIELD OF INVENTION

This disclosure generally relates to the recognition of objects in a traffic space by means of a radar sensor system.

BACKGROUND OF INVENTION

Modern motor vehicles are often equipped with advanced driver assistance systems (ADAS), such as lane departure warning systems, lane change assistance systems, active brake assist systems and the like. Such systems generally require a reliable identification of objects such as obstacles, other vehicles or pedestrians present in the environment of the host vehicle. The recognition of stationary objects is of particular importance. In many applications, it is desired to find the boundaries of stationary objects. Based on the boundaries, a map of the observed traffic space can be generated.

Radar sensor systems often use the known Doppler effect to gather information relating to objects moving relative to the host vehicle. The Doppler effect or Doppler shift is a change in frequency observed when a wave source moves relative to the receiver. A Range-Doppler-map can be generated more quickly and easily than a X-Y-map showing the actual positions of detected objects.

Usually, radar sensor systems output frames or scans. In each of the frames or scans, a plurality of single detections can be identified. In the context of the present disclosure, single detections are spot-like portions of the Range-Doppler-map which fulfill a predefined detection criterion. For example, pixels having intensity values above a threshold or defining a local maximum may constitute single detections.

The shapes of the real objects may be approximated based on the single detections—for example by creating a polyline connecting the detections on the ground plane. To determine an object boundary in this way, the range and the observation angle can be computed for each of the detections. However, the calculation of the observation angle or azimuth, for example by means of an angle-finding process, is rather complicated. Furthermore, due to the multitude of detections usually present, the computational effort is rather high.

To reduce the computational burden, it is possible to carry out the calculations only for a subset of the detections, for example only for the strongest detections. This can be performed using a threshold. Due to the spread of the Doppler signal, however, it is often difficult to find sufficient detections in all range regions of interest. This problem is particularly severe in situations where a stationary object is passed by the host vehicle.

SUMMARY OF THE INVENTION

The present invention relates to a method for the recognition of objects in a traffic space by means of a radar sensor system arranged at or in a host vehicle, comprising the steps:

(i) transmitting a primary radar signal into the traffic space, (ii) receiving a secondary radar signal reflected by at least one object, and (iii) identifying a plurality of single detections corresponding to object surface spots detected by the radar sensor system, wherein the positions of the single detections in a Range-Doppler-map are determined, wherein the Range-Doppler-map has a range axis representing the distance between the radar sensor system and the respective object surface spot and a Doppler axis representing the Doppler shift of the secondary radar signal as reflected by the respective object surface spot relative to the primary radar signal.

In one embodiment, (iv) at least a region of the Range-Doppler map is divided into a plurality of adjacent evaluation regions separated by separation lines, wherein the separation lines extend parallel to one of the range axis and the Doppler axis, (v) for each evaluation region, at least one selected detection is determined which has, among the detections present in the respective evaluation region, an extremal value with respect to the other axis of the range axis and the Doppler axis, and (vi) a boundary of the at least one object is determined based on the selected detections.

The division of the Range-Doppler-map into evaluation regions enables a considerable reduction of the computational effort necessary for the determination of the object boundary, because angle calculations and the like only have to be carried out for a limited number of detections. Simultaneously, it is ensured that there is least one selected detection for each evaluation region and thus for each portion of the range axis or the Doppler axis. This means that the selected detections are distributed over a large section of the range axis or the Doppler axis, respectively. The reliability of the subsequent boundary recognition is thus enhanced. The separation lines can be called "fences", since they define a border of an area. Specifically, separation lines extending parallel to the range axis can be called "Doppler fences", whereas separation lines extending parallel to the Doppler axis can be called "range fences".

Advantageous embodiments of the invention can be seen from the dependent claims, from the following description and from the appended figures.

In step (vi), the boundary of the at least one object can be determined exclusively based on the selected detections. The remaining, i. e. non-selected detections can be discarded, at least for the purpose of determining the object boundary. Thus, the number of calculations is kept low. However, it is also possible that the boundary of the at least one object can be determined based on a combination of the selected detections with detections fulfilling a separate detection criterion.

For determining the boundary of the at least one object in step (vi), an observation angle between a current line of sight and a fixed reference axis, in particular a driving direction or a longitudinal axis of the host vehicle, can be computed for each of the selected detections. The line of sight extends from the object surface spot associated with the respective detection to an active region of the radar sensor system. If both the range and the observation angle are known for a specific detection, the position of the respective object surface spot in Cartesian coordinates can be indicated.

According to an embodiment of the invention, the separation lines extend parallel to the range axis, wherein in step (v) a selected detection is determined which has, among the detections present in the respective evaluation region, the lowest range value. According to this embodiment, it is checked in step (v) which of the detections present in the respective evaluation region has the lowest range value. This check requires only little computational effort. The selection of the "closest" detections over an angular range enables an efficient determination of that surface portion of the object that at least essentially faces the radar sensor system.

According to another embodiment of the invention, the separation lines extend parallel to the Doppler axis, wherein in step (v) a selected detection is determined which has, among the detections present in the respective evaluation region, the highest or lowest Doppler value. According to this embodiment, it is checked in step (v) which of the detections present in the respective evaluation region has the highest or the lowest Doppler value, which requires only little computational effort and enables an efficient determination of surface portions of the object extending at least essentially in the direction of propagation of the primary radar signal.

It can be provided that in step (v), a first selected detection is determined which has, among the detections present in the respective evaluation region, the highest Doppler value and a second selected detection is determined which has, among the detections present in the respective evaluation region, the lowest Doppler value. Thus, lateral surfaces on both sides of a front surface of the object can be determined.

According to another embodiment of the invention, step (v) is carried out for a first set of evaluation regions separated by Doppler separation lines extending parallel to the range axis and subsequently for a second set of evaluation regions separated by range separation lines extending parallel to the Doppler axis, or vice versa. I. e. the range selection and the Doppler selection as described above can be combined to refine the selection process.

It can be provided that after carrying out step (v) for the first set of evaluation regions, a spread is defined based on the selected detections, wherein step (v) is carried out for the second set of evaluation regions only considering detections being outside the spread. According to a preferred embodiment, the selection is first carried out based on Doppler fences. Then it is checked which of the selected detections has the lowest Doppler value and which of the selected detections has the highest Doppler value. The range between the lowest Doppler value and the highest Doppler value is defined as the Doppler spread. Subsequently, a selection is carried out based on range fences. However, only such selected detections are considered for further calculations that are located outside the spread. This procedure avoids the selection of ghost detections which are "behind" a front surface of the object.

In step (iv), the field of view of the radar sensor system can be divided into field-of-view-regions and the evaluation regions can be defined by transforming the field-of-view-regions into the Range-Doppler-map. This enables an adequate division of the real world space of interest. Preferably, only a region of the Range-Doppler-map is divided into evaluation regions, in particular a region which corresponds to the field of view of the radar sensor system. The field of view is the effective sensing region of the radar sensor system in a Cartesian coordinate system, ranging from a minimum angle to a maximum angle and from a minimum radius to a maximum radius.

The field-of-view-regions can have the shape of, preferably regular, circular sectors. This corresponds to an angular division of the field of view.

Alternatively, the field-of-view-regions can have the shape of annular sectors. This corresponds to a radial division of the field of view.

It can be provided that in step (iv), less than 15 separation lines, preferably 2 to 10 separation lines and more preferably 3 to 7 separation lines are defined to divide at least a region of the Range-Doppler map into a plurality of adjacent evaluation regions. It has turned out that such a number of evaluation regions is sufficient for a reliable boundary recognition.

The invention also relates to a system for the recognition of objects in a traffic space comprising a radar sensor system for transmitting a primary radar signal into a traffic space and for receiving a secondary radar signal reflected by at least one object and an electronic processing unit for processing the secondary radar signal.

According to the invention, the electronic processing unit is configured for carrying out a method in accordance with any one of the preceding claims.

Dependent on the application, the electronic processing device may be united with the radar sensor system or configured as a separate unit. The electronic processing unit may comprise a computer.

Preferably, the radar sensor system is configured to be mounted to a side portion or a corner portion of the host vehicle.

The invention further relates to a computer program product including executable program code which, when executed, carries out a method as disclosed above.

The disclosure with reference to the inventive method is also true for the inventive system and the inventive computer program product.

Further features and advantages will appear more clearly on a reading of the following detailed description of the preferred embodiment, which is given by way of non-limiting example only and with reference to the accompanying drawings.

BRIEF DESCRIPTION OF DRAWINGS

Subsequently, the present invention is explained in more detail based on an exemplary embodiment with reference to the accompanying figures, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
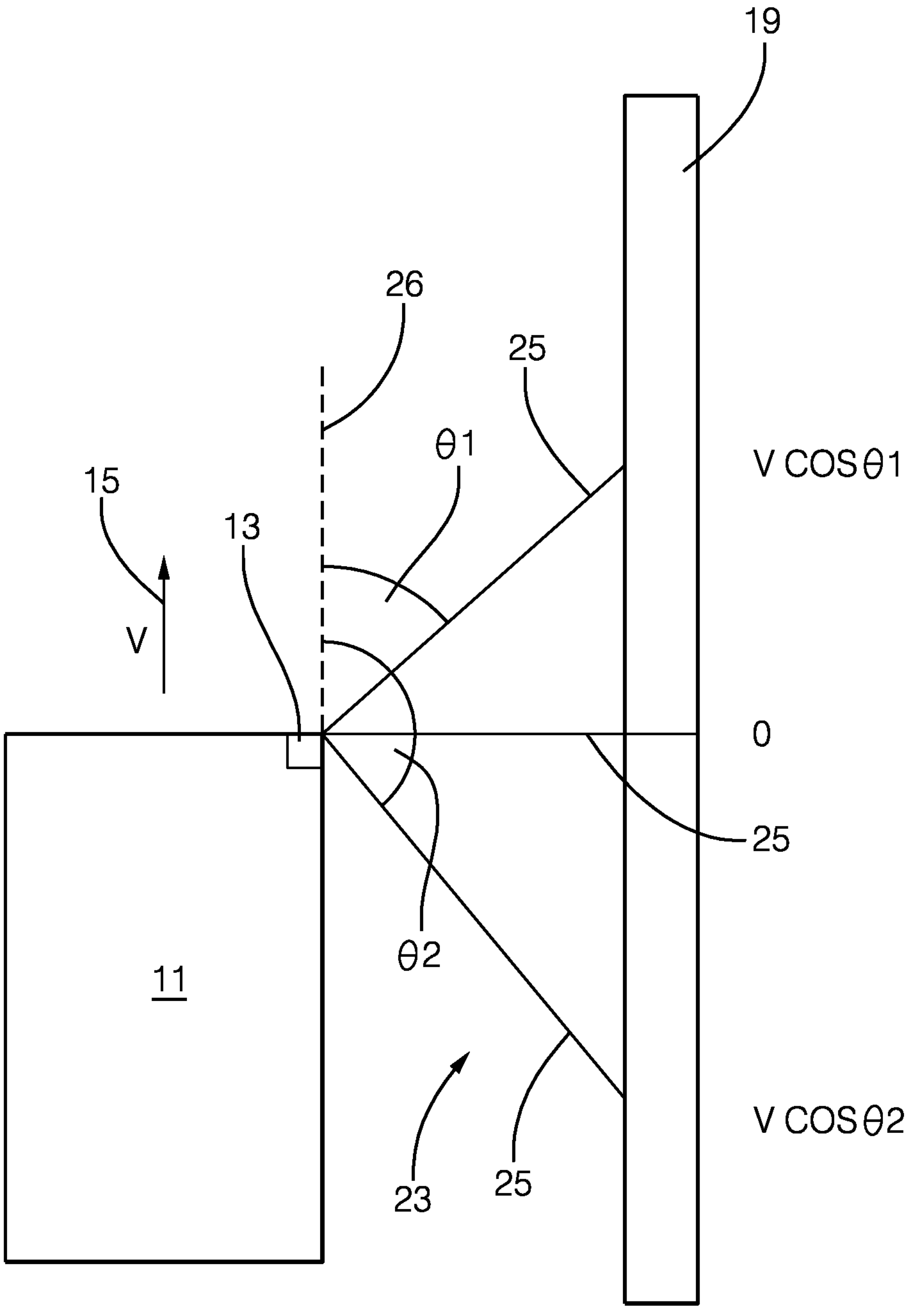
FIG. 1 shows, in a top view, a motor vehicle, a radar sensor system mounted to the motor vehicle and a stationary object to be detected by the radar sensor system.

In FIG. 1, there is shown a motor vehicle 11, also called a host vehicle, and a side-viewing radar sensor system 13 mounted to a front corner section of the motor vehicle 11. The radar sensor system 13 is preferably based on a millimeter wave radar sensor. A single channel radar sensor is preferred to minimize the production costs. However, a multiple channel radar sensor may be provided to enhance the detection performance. The radar sensor system 13 can be connected to an electronic processing device (not shown), for example an advanced emergency braking system, a pedestrian collision avoidance system or an autonomous driving system.

In operation, the motor vehicle 11 is moving at a speed v in a driving direction 15. A stationary object 19, for example a wall, is located next to the motor vehicle 11. The stationary object 19 extends along the driving direction 15. FIG. 1 shows a situation where the motor vehicle 11 passes the stationary object 19.

The radar sensor system 13 is configured for transmitting a primary radar signal into the traffic space 23 beside the motor vehicle 11 and for detecting the stationary objects 19 present in the traffic space 23 on the basis of a secondary radar signal reflected by the stationary objects 19. A line of sight 25 which extends from a specific spot of the stationary object 19 to the active region of the radar sensor system 13 is called a "line of sight". The speed component related to such a spot and oriented along the respective line of sight 25 can be determined in a known manner using the Doppler effect. It is known that the relationship between the relative Doppler shift d and the speed v of the motor vehicle 11 is given as:

$$d=v\cos(\theta) \quad (1)$$

wherein θ is the angle between the line of sight 25 and a reference axis 26 parallel to the driving direction 15.

Figure 8:
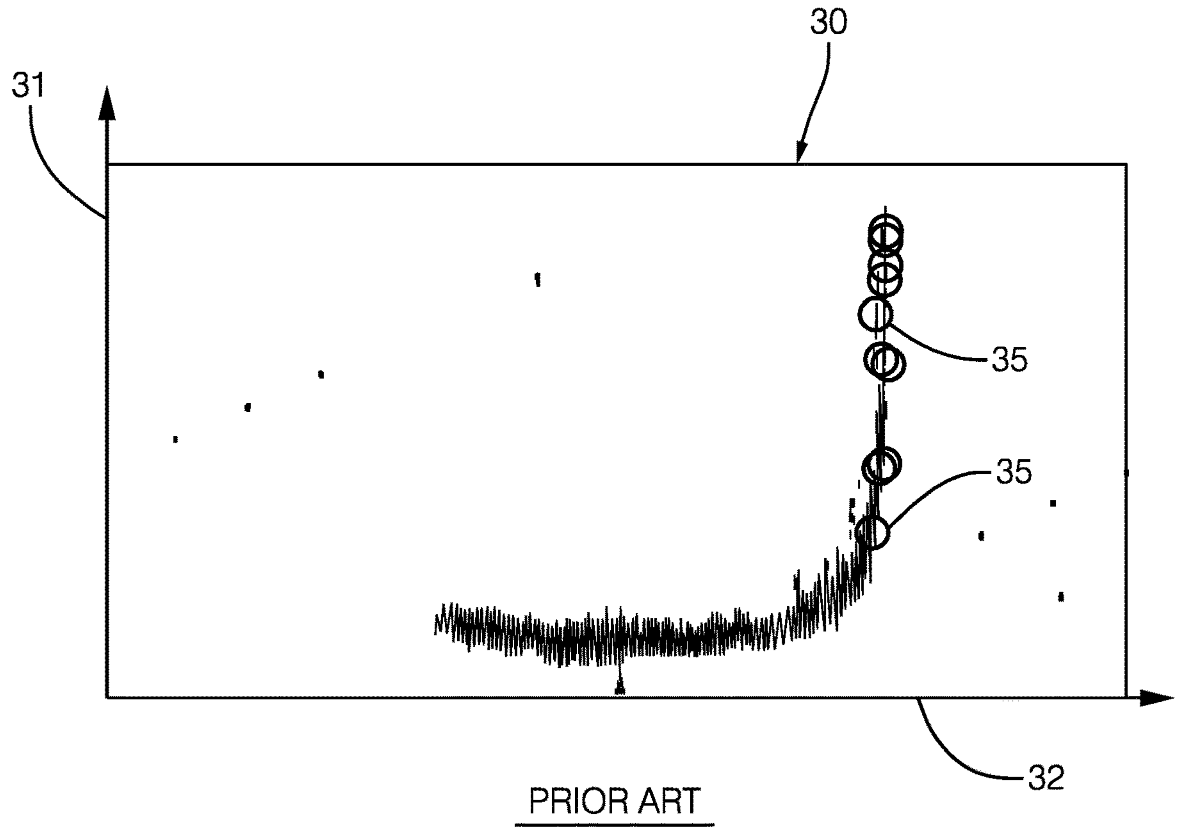
FIG. 8 is a Range-Doppler map showing an exemplary radar output signal as well as selected detections determined by a method according to the prior art.

Based on the secondary radar signal, a Range-Doppler-map 30 as shown in FIG. 8 is generated. The Range-Doppler-map 30 has a range axis 31 representing the distance between the radar sensor system 13 and the respective surface spot and a Doppler axis 32 representing the relative Doppler shift of the secondary radar signal as reflected by the respective surface spot relative to the primary radar signal. To generate the Range-Doppler-Map 30, the secondary radar signal is sampled in the time domain and then subjected to a Fast Fourier Transform (FFT). The Range-Doppler-map 30 can refer to a single channel or the average, for example the average amplitude, of different channels. Dependent on the application, the Range-Doppler-map 30 can be a raw data output of a FFT with windowing or be based on an output which has been subjected to post-processing steps such as thresholding or other algorithms.

Portions of the Range-Doppler-map 30 that fulfill a predefined detection criterion form single detections 35. Generally, a plurality of single detections 35 can be determined. In FIG. 8, detections 35 are shown which are determined by means of thresholding. It can be seen that most of the detections 35 are in the far range, while in the near range no detections are found.

Since different parts of the stationary object 19 (FIG. 1) have different relative Doppler shifts and the stationary object 19 extends along the driving direction 15, there is a pronounced spread of the output signal along the Doppler axis 32. Therefore, the peak reflection power is reduced and particularly detections in the low range region often fail to reach the threshold.

According to the invention, this problem is avoided by determining selected detections 35' as shown in FIGS. 2-7 and explained in further detail below.

Figure 2:
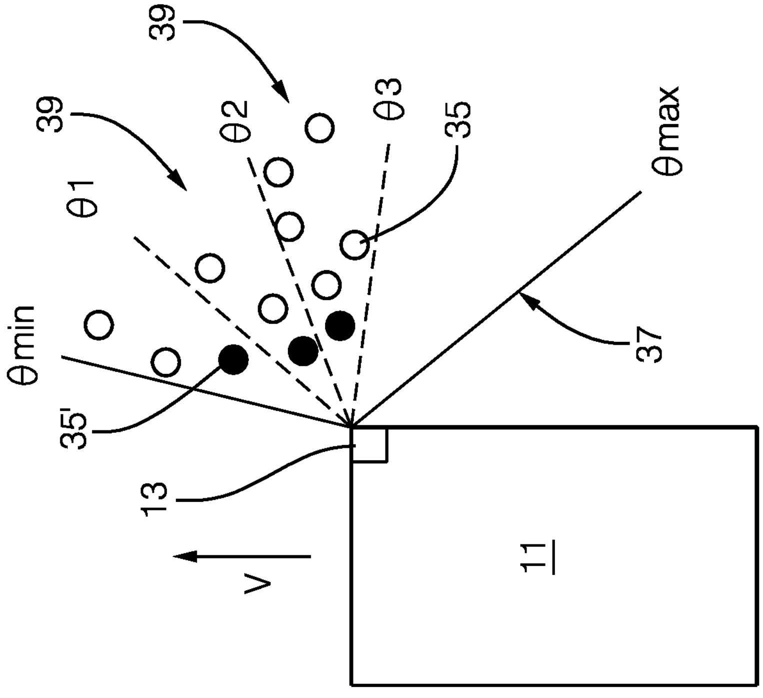
FIG. 2 shows an angular division of the field of view of a radar sensor system used in a method according to an embodiment of the invention.

According to FIG. 2, the field of view 37 of the radar sensor system 13 is divided into field-of-view-regions 39. According to an embodiment of the invention, the field-of-view-regions 39 are regular circular sectors. Specifically, the field-of-view-regions 39 are defined by applying an incremental angle Δθas follows:

$$\theta_n=\theta_{min}+n\cdot\Delta\theta \quad (2)$$

wherein $\theta_{min}$ is a minimal observation angle of the radar sensor system 13 and n is a natural number. The borders separating the field-of-view-regions 39 are shown as dashed lines.

Figure 3:
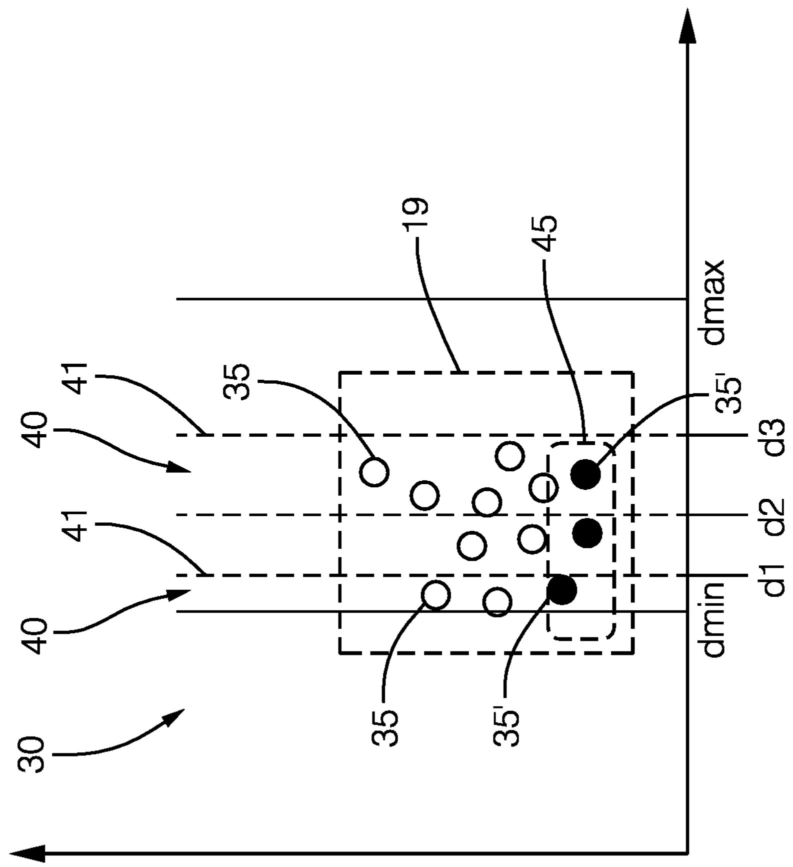
FIG. 3 shows a division of a Range-Doppler-map which corresponds to the angular division according to FIG. 2.

The field-of-view-regions 39 are transformed into the Range-Doppler-space to generate evaluation regions 40 as shown in FIG. 3. The projection of the angular separation lines on the Range-Doppler map 30 can be written as $$d_n = v \cdot \cos(\theta_n). \tag{3}$$

Based on formulae (2) and (3), a series of vertical lines called Doppler fences 41 or separation lines 41 is generated. The evaluation regions 40 are separated by the Doppler fences 41. The first and the last evaluation region 40 are partly defined by a minimal Doppler value $d_{min}$ and a maximal Doppler value $d_{max}$, respectively.

For each evaluation region 40, it is determined which of the detections 35 present in the respective evaluation region 40 has the lowest range value. This detection 35', shown as filled dot in FIG. 3, is selected for further processing. A set 45 of selected detections 35' is generated. In this manner, the closest detections 35' corresponding to the closest boundary of the stationary object 19 are found.

A common problem in radar sensor technology is the generation of ghost targets as a consequence of multi-path propagation. The closest detection 35' in a certain angle scope is likely to result from a reflection from the real object 19. Therefore, the selection of the closest detections 35' reduces or avoids the problem of ghost targets.

Figure 5:
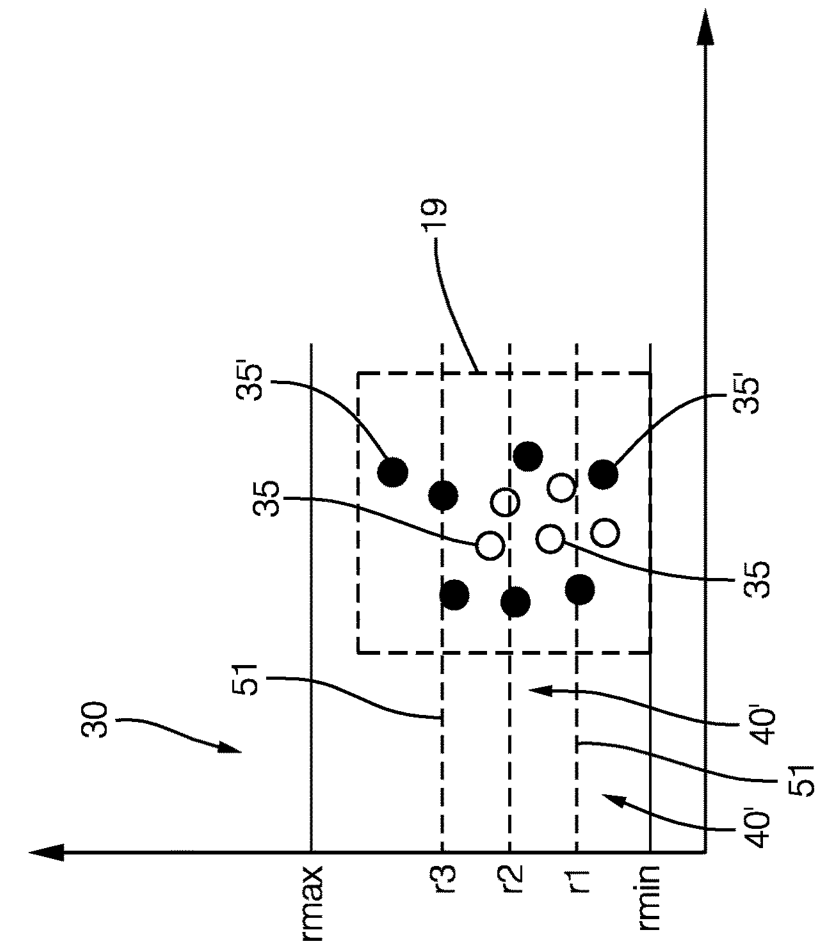
FIG. 5 shows a division of a Range-Doppler-map which corresponds to the radial division according to FIG. 4.
Figure 4:
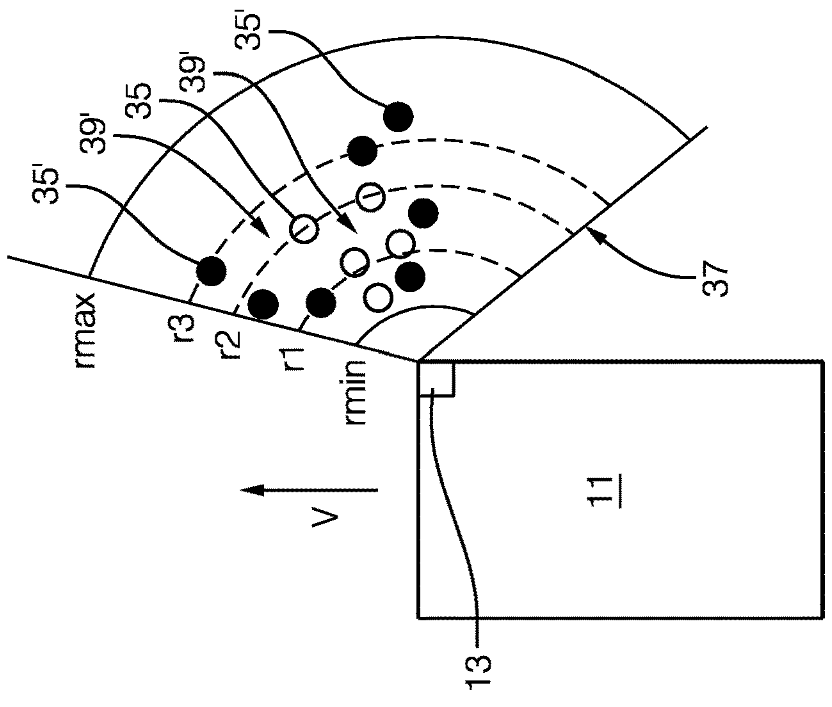
FIG. 4 shows a radial division of the field of view of a radar sensor system used in a method according to an embodiment of the invention.

FIGS. 4 and 5 refer to an alternative embodiment of the invention. The field-of-view-regions 39' are annular sectors instead of circular sectors. Specifically, the field-of-view-regions 39' are defined by applying an incremental radius Δr as follows:

$$r_n = r_{min} + n \cdot \Delta r \tag{4}$$

wherein $r_{min}$ is a minimal observation radius of the radar sensor system 13 and n is a natural number. The borders separating the field-of-view-regions 39' are shown as dashed circular arcs.

The field-of-view-regions 39' are transformed into the Range-Doppler-space to generate evaluation regions 40' as shown in FIG. 5.

Based on formula (4), a series of horizontal lines called range fences 51 or separation lines 51 is generated. The evaluation regions 40' are separated by the range fences 51. The first and the last evaluation region 40' are partly defined by a minimal range value $r_{min}$ and a maximal range value $r_{max}$, respectively.

For each evaluation region 40', it is determined which of the detections 35 present in the respective evaluation region 40' has the lowest Doppler value and which of the detections 35 present in the respective evaluation region 40' has the highest Doppler value. These detections 35', shown as filled dots in FIG. 5, are selected for further processing. The detections 35' having extremal Doppler values are related to the maximum and minimum observation angle θ and thus to the contour of the stationary object 19.

Figure 7:
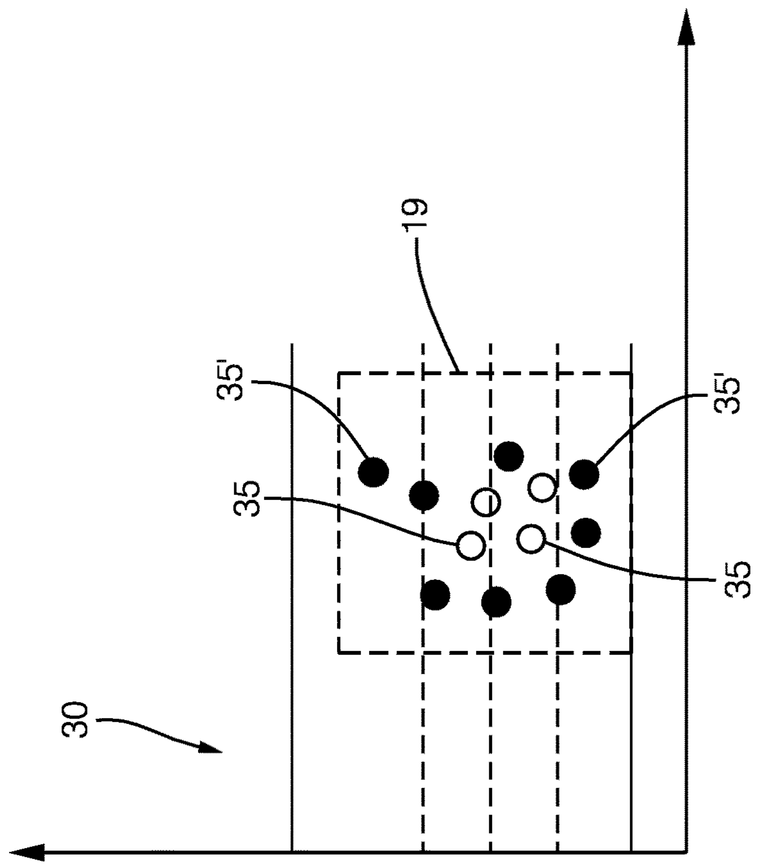
FIG. 7 shows the selected detections according to FIG. 6 in a Range-Doppler map.
Figure 6:
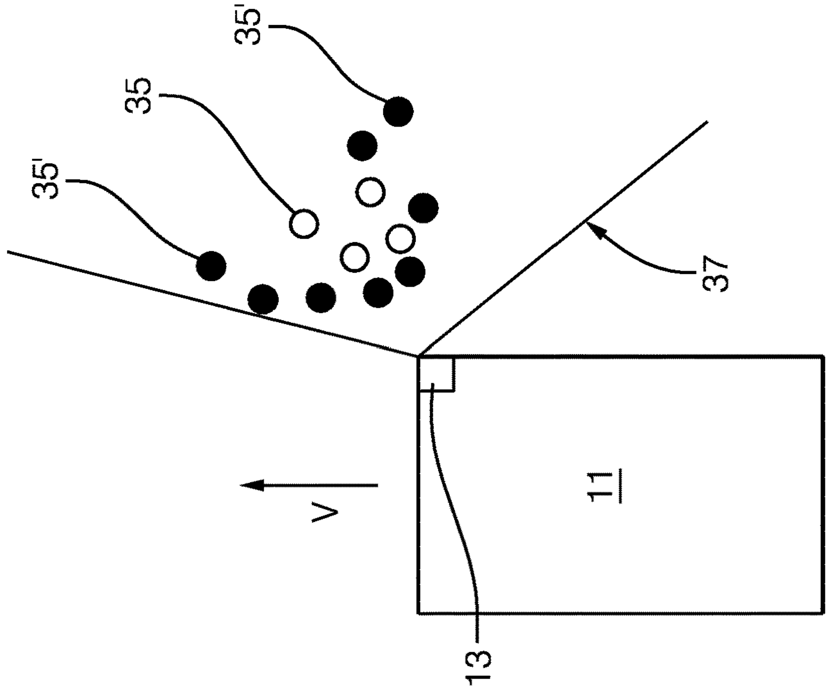
FIG. 6 shows selected detections determined by a method according to an embodiment of the invention in a top view.

The selection of detections 35' based on Doppler fences 41 according to FIGS. 2 and 3 can be combined with a selection of detections 35' based on range fences 51 according to FIGS. 4 and 5 to find more detections 35' related to the outer surface of the stationary object 19. The result of such a combined selection is shown in FIGS. 6 and 7.

According to a specific embodiment of the invention, selected detections 35' are determined based on Doppler fences 41 as shown in FIG. 3. Based on these detections, a Doppler spread ranging from $d_{min}$ to $d_{max}$ is defined. Then selected detections 35' are determined based on range fences 51 as shown in FIG. 5. If the detections found in this step are outside the defined Doppler spread, they are used for further processing, otherwise they are removed from the list of selected detections 35'.

Figure 9:
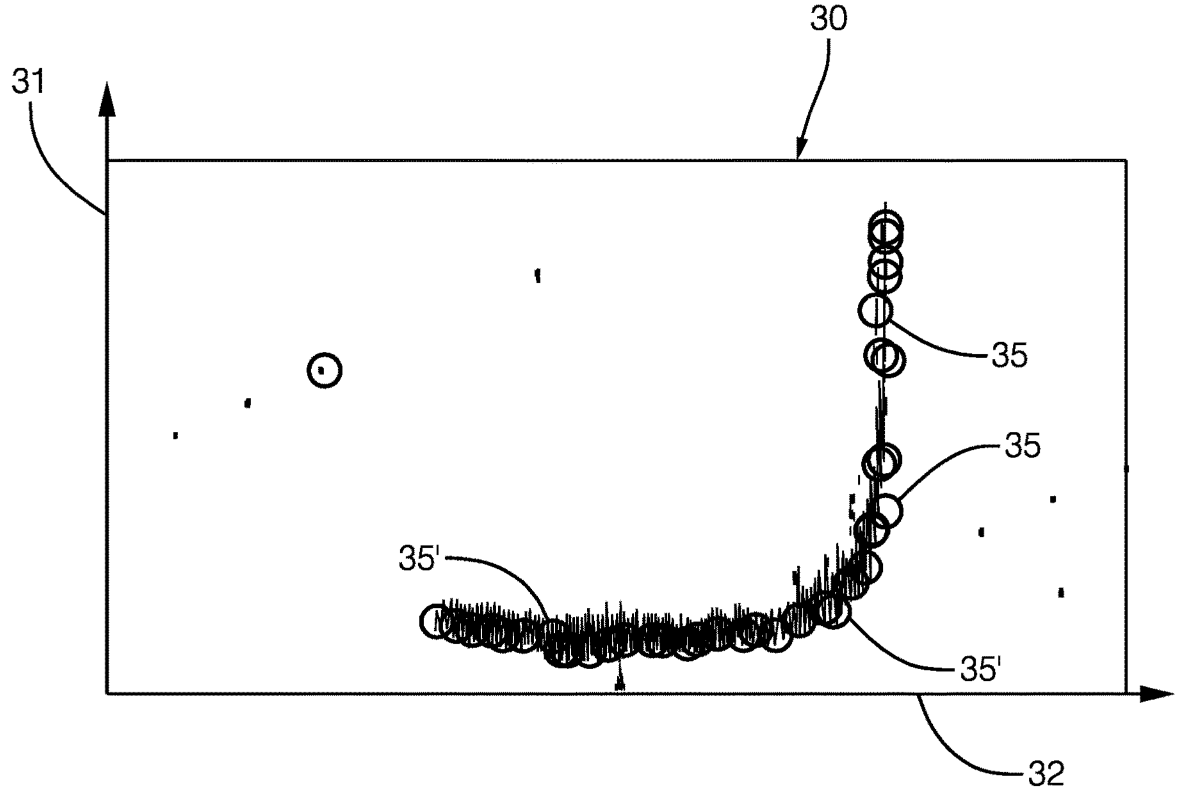
FIG. 9 is a Range-Doppler map showing an exemplary radar output signal as well as selected detections determined by a method according to an embodiment of the invention.
Figure 10:
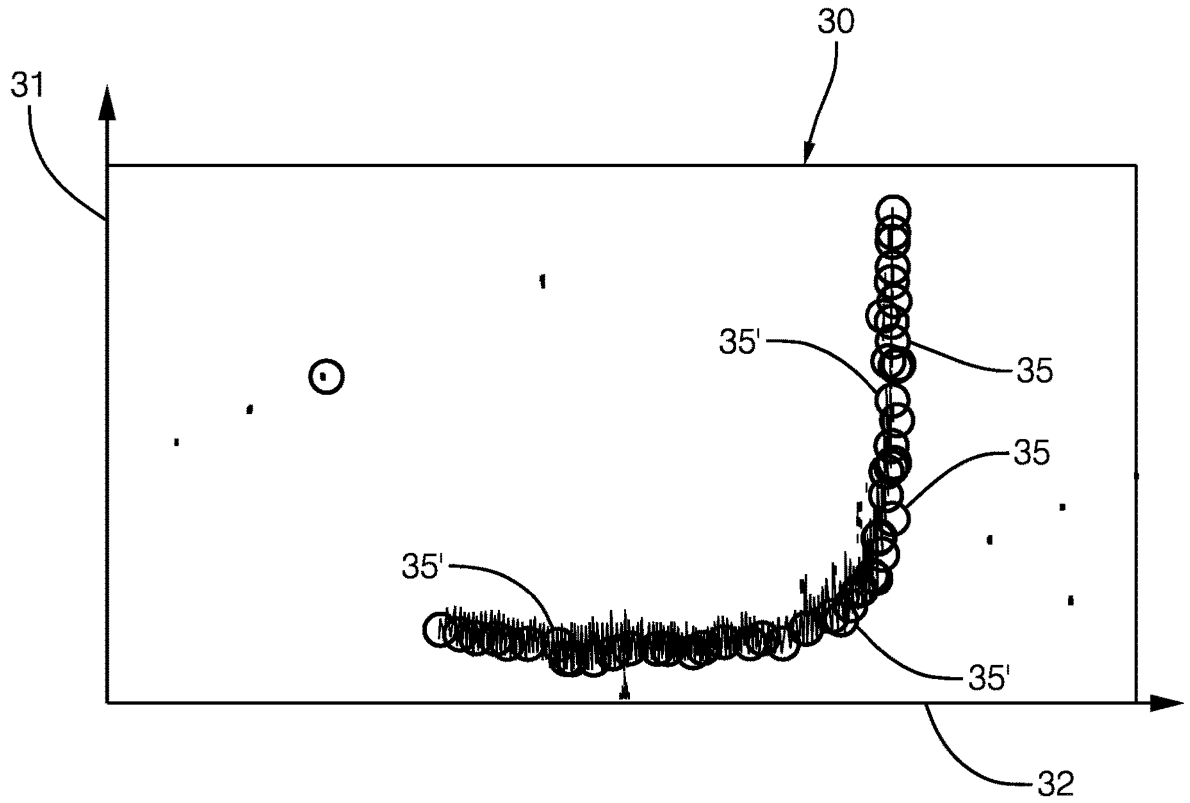
FIG. 10 is a Range-Doppler-map showing an exemplary radar output signal as well as selected detections determined by a method according to an alternative embodiment of the invention.

FIGS. 8-10 show the Range-Doppler-maps 30 displaying the same secondary radar signal. In FIG. 8, detections 35 found by a conventional thresholding process are shown. In the low range region, no detections are present. In FIG. 9, detections 35' found by a method according to the invention using Doppler fences 41 as shown in FIG. 3 are indicated in addition to the detections 35 found by the conventional thresholding process. It can be seen that more detections 35, 35' in the near range are found.

In FIG. 10, detections 35' found by a method according to the invention using a combination of Doppler fences 41 as shown in FIG. 3 and range fences 51 as shown in FIG. 5 are indicated in addition to the detections 35 found by the conventional thresholding process. Compared to FIG. 9, more detections 35, 35' in the far range are found.

Based on the selected detections 35', the boundary of the stationary object 19 in a vehicle coordinate system is determined. For this purpose, the observation angle θ is computed for each of the selected detections 35', preferably by means of an angle-finding process.

Figure 11:
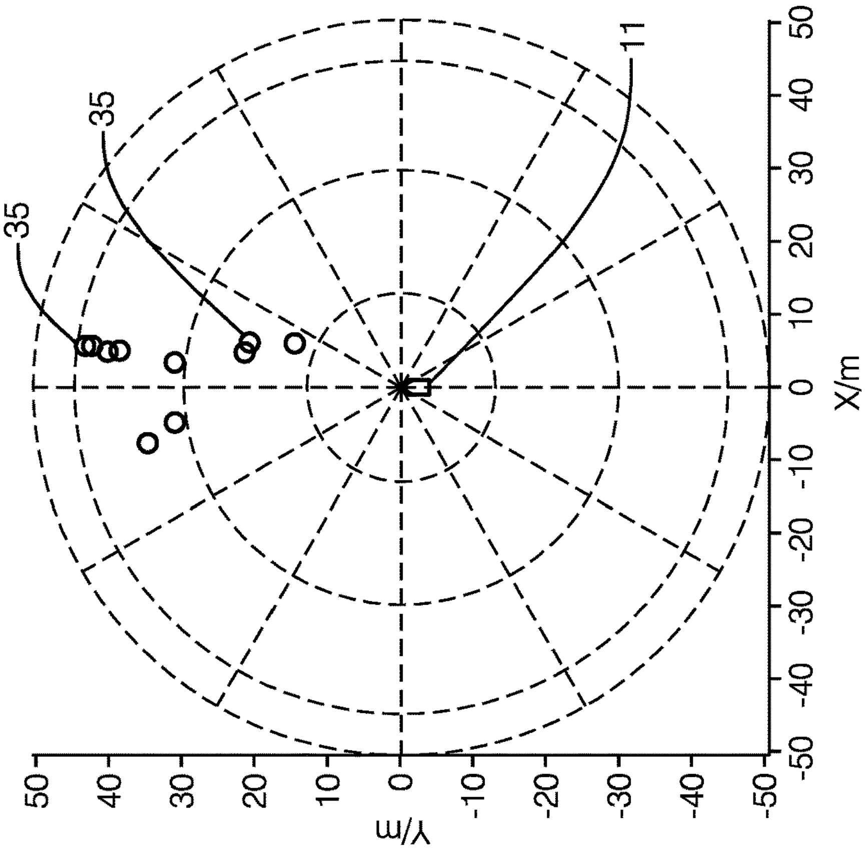
FIG. 11 shows selected detections determined by a method according to the prior art in a Cartesian coordinate system.
Figure 12:
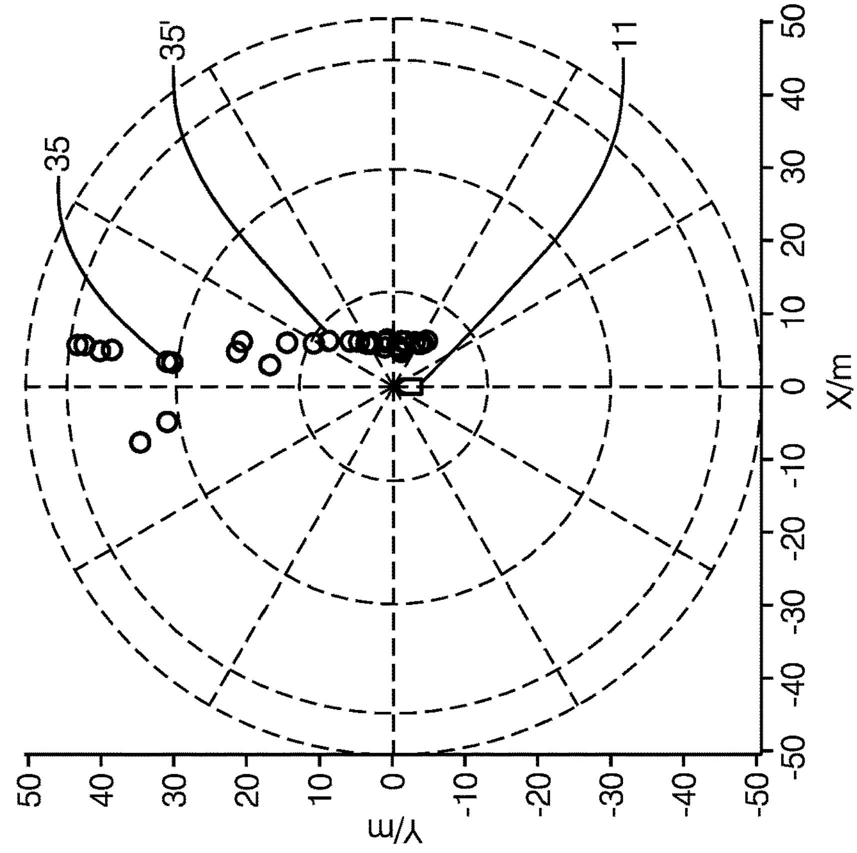
FIG. 12 shows selected detections determined by a method according to an embodiment of the invention in a Cartesian coordinate system.

In FIG. 11, detections 35 found by a conventional thresholding process are shown in a Cartesian coordinate system. The origin of the Cartesian coordinate system is located at the front bumper of the motor vehicle 11. For comparison, FIG. 12 shows detections 35 found by the conventional thresholding process and in addition detections 35 found by a method in accordance with the invention. The boundary of the stationary object 19 is discernible more clearly, since more detections 35, 35' are present.

By the use of range fences 51 and/or Doppler fences 41, the Doppler resolution can be intentionally reduced to get a signal having a higher level from the stationary object 19.

In order to properly apply the Doppler fences 41, it is necessary that the stationary object 19 is located beside the motor vehicle 11. Otherwise, there is no unambiguous relationship between the observation angle θ and the relative Doppler.

An advantage of a method in accordance with the invention in comparison with a common contour extraction algorithm is a reduction of the number of detections 35 and thus a reduction of angle finding calculations. As the Range-Doppler-map 30 does not present the actual physical shape of a stationary object 19, there can be an over-sampling or an under-sampling. For example, if the motor vehicle 11 is driving at a high speed v, the objects 19 on the sides of the motor vehicle 11 have a large Doppler spread even if they are positioned relatively close to the motor vehicle 11. This leads to an over-sampling of the Range-Doppler contour. The use of range fences 51 and/or Doppler fences 41 avoids such an undesired over-sampling.

The invention thus enables a reliable recognition of stationary objects 19 by means of a radar sensor system 13 without the necessity to carry out a multitude of complex computations.

While this invention has been described in terms of the preferred embodiments thereof, it is not intended to be so limited, but rather only to the extent set forth in the claims that follow.

We claim:

1. A method for recognition of objects in a traffic space by means of a radar sensor system arranged at or in a host vehicle, said method comprising:

(i) transmitting a primary radar signal into the traffic space;

(ii) receiving a secondary radar signal reflected by at least one object;

(iii) identifying a plurality of detections corresponding to object surface spots detected by the radar sensor system, wherein positions of the detections in a Range-Doppler-map are determined, wherein the Range-Doppler-map has a range axis representing a distance between the radar sensor system and a respective object surface spot of the object surface spots and a Doppler axis representing a Doppler shift of the secondary radar signal as reflected by the respective object surface spot relative to the primary radar signal;

(iv) dividing at least a region of the Range-Doppler map into a plurality of adjacent evaluation regions separated by separation lines, wherein the separation lines extend parallel to the range axis or the Doppler axis;

(v) for each evaluation region of the adjacent evaluation regions, determining at least one selected detection among the detections present in the evaluation region that has an extremal value with respect to the range axis or the Doppler axis, the extremal value being:

a lowest range value among the detections in the evaluation region when the separation lines extend parallel to the range axis, the lowest range value corresponding to an object surface spot facing the radar sensor system; or a highest or lowest Doppler value among the detections in the evaluation region when the separation lines extend parallel to the Doppler axis, the highest or lowest Doppler value corresponding to the object surface spot extending in a direction of propagation of the primary radar signal; and (vi) determining a boundary of the at least one object based on the at least one selected detection of each evaluation region.

2. The method in accordance with claim 1, wherein in step (vi), the boundary of the at least one object is determined exclusively based on the selected detections or based on a combination of the selected detections with detections fulfilling a separate detection criterion.

3. The method in accordance with claim 1, wherein for determining the boundary of the at least one object in step (vi), an observation angle between a current line of sight and a fixed reference axis, in particular a driving direction or a longitudinal axis of the host vehicle, is computed for each of the selected detections.

4. The method in accordance with claim 1, wherein in step (v) when the separation lines extend parallel to the Doppler axis, a first selected detection is determined which has, among the detections present in the evaluation region, the highest Doppler value and a second selected detection is determined which has, among the detections present in the evaluation region, the lowest Doppler value.

5. The method in accordance with claim 1, wherein the step (v) is carried out for a first set of evaluation regions separated by Doppler separation lines extending parallel to the range axis and subsequently for a second set of evaluation regions separated by range separation lines extending parallel to the Doppler axis, or vice versa.

6. The method in accordance with claim 5, wherein after carrying out the step (v) for the first set of evaluation regions, a spread is defined based on the selected detections, wherein step (v) is carried out for the second set of evaluation regions only considering detections being outside the spread.

7. The method in accordance with claim 1, wherein in step (iv), a field of view of the radar sensor system is divided into field-of-view regions and the evaluation regions are defined by transforming the field-of-view regions into the Range-Doppler-map.

8. The method in accordance with claim 7, wherein the field-of-view-regions are circular sectors.

9. The method in accordance with claim 7, wherein the field-of-view-regions are annular sectors.

10. The method in accordance with claim 1, wherein in step (iv), less than 15 separation lines are defined to divide at least a region of the Range-Doppler map into a plurality of adjacent evaluation regions.

11. The method in accordance with claim 1, wherein in step (iv), 2 to 10 separation lines are defined to divide at least a region of the Range-Doppler map into a plurality of adjacent evaluation regions.

12. The method in accordance with claim 1, wherein in step (iv), 3 to 7 separation lines are defined to divide at least a region of the Range-Doppler map into a plurality of adjacent evaluation regions.

13. A system for recognition of objects in a traffic space comprising:

a radar sensor system for (i) transmitting a primary radar signal into a traffic space and for (ii) receiving a secondary radar signal reflected by at least one object; and an electronic processing unit for processing the secondary radar signal, wherein the electronic processing unit is configured to:

(iii) identify a plurality of detections corresponding to object surface spots detected by the radar sensor system, wherein positions of the detections in a Range-Doppler-map are determined, wherein the Range-Doppler-map has a range axis representing a distance between the radar sensor system and a respective object surface spot of the object surface spots and a Doppler axis representing a Doppler shift of the secondary radar signal as reflected by the respective object surface spot relative to the primary radar signal;

(iv) divide at least a region of the Range-Doppler map into a plurality of adjacent evaluation regions separated by separation lines, wherein the separation lines extend parallel to the range axis or the Doppler axis;

(v) for each evaluation region of the adjacent evaluation regions, determine at least one selected detection among the detections present in the evaluation region that has an extremal value with respect to the range axis or the Doppler axis, the extremal value being:

a lowest range value among the detections in the evaluation region when the separation lines extend parallel to the range axis, the lowest range value corresponding to an object surface spot facing the radar sensor system; or a highest or lowest Doppler value among the detections in the evaluation region when the separation lines extend parallel to the Doppler axis, the highest or lowest Doppler value corresponding to the object surface spot extending in a direction of propagation of the primary radar signal; and (vi) determine a boundary of the at least one object based on the at least one selected detection of each evaluation region.

14. The system in accordance with claim 13, wherein the radar sensor system is configured to be mounted to a side portion or a corner portion of a host vehicle.

15. The system in accordance with claim 13, wherein in step (vi), the boundary of the at least one object is determined exclusively based on the selected detections or based on a combination of the selected detections with detections fulfilling a separate detection criterion.

16. The system in accordance with claim 13, wherein the electronic processing unit, for determining the boundary of the at least one object in step (vi), is configured to compute an observation angle between a current line of sight and a fixed reference axis, in particular a driving direction or a longitudinal axis of the host vehicle, for each of the selected detections.

17. The system in accordance with claim 13, wherein in step (v) when the separation lines extend parallel to the Doppler axis, the electronic processing unit is further configured to determine:

a first selected detection which has, among the detections present in the evaluation region, the highest Doppler value; and a second selected detection which has, among the detections present in the evaluation region, the lowest Doppler value.

18. The system in accordance with claim 13, wherein the electronic processing unit is further configured to carry out step (v) for a first set of evaluation regions separated by Doppler separation lines extending parallel to the range axis and subsequently for a second set of evaluation regions separated by range separation lines extending parallel to the Doppler axis, or vice versa.

19. The system in accordance with claim 18, wherein after carrying out the step (v) for the first set of evaluation regions, the electronic processing unit is configured to define a spread based on the selected detections, wherein step (v) is carried out for the second set of evaluation regions only considering detections being outside the spread.

20. A non-transitory computer-readable media including computer-executable instructions that, when executed, causes a radar sensor system to:

(i) transmit a primary radar signal into a traffic space; and (ii) receive a secondary radar signal reflected by at least one object; and an electronic processing unit for processing the secondary radar signal to:

(iii) identify a plurality of detections corresponding to object surface spots detected by the radar sensor system, wherein positions of the detections in a Range-Doppler-map are determined, wherein the Range-Doppler-map has a range axis representing a distance between the radar sensor system and a respective object surface spot of the object surface spots and a Doppler axis representing a Doppler shift of the secondary radar signal as reflected by the respective object surface spot relative to the primary radar signal;

(iv) divide at least a region of the Range-Doppler map into a plurality of adjacent evaluation regions separated by separation lines, wherein the separation lines extend parallel to the range axis or the Doppler axis;

(v) for each evaluation region of the adjacent evaluation regions, determine at least one selected detection among the detections present in the evaluation region that has an extremal value with respect to the range axis or the Doppler axis, the extremal value being:

a lowest range value among the detections in the evaluation region when the separation lines extend parallel to the range axis, the lowest range value corresponding to an object surface spot facing the radar sensor system; or a highest or lowest Doppler value among the detections in the evaluation region when the separation lines extend parallel to the Doppler axis, the highest or lowest Doppler value corresponding to the object surface spot extending in a direction of propagation of the primary radar signal; and (vi) determine a boundary of the at least one object based on the at least one selected detection of each evaluation region.

* * * * *